(12) United States Patent
Guy et al.

(10) Patent No.: US 8,806,648 B2
(45) Date of Patent: Aug. 12, 2014

(54) AUTOMATIC CLASSIFICATION OF SECURITY VULNERABILITIES IN COMPUTER SOFTWARE APPLICATIONS

(75) Inventors: Lotem Guy, Hod Hasharon (IL); Daniel Kalman, Tel-Aviv (IL); Omer Tripp, Har-Adar (IL); Omri Weisman, Tel-Aviv (IL)

(73) Assignee: International Business Machines Corporation, Armonk, NY (US)

( * ) Notice: Subject to any disclaimer, the term of this patent is extended or adjusted under 35 U.S.C. 154(b) by 28 days.

(21) Appl. No.: 13/609,320

(22) Filed: Sep. 11, 2012

(65) Prior Publication Data
US 2014/0075560 A1      Mar. 13, 2014

(51) Int. Cl.
*G06F 21/00*       (2013.01)
(52) U.S. Cl.
USPC ............. 726/25; 713/189; 713/190; 713/191; 713/192; 713/193; 713/194; 726/22; 726/23; 726/24
(58) Field of Classification Search
USPC ................. 726/22–25; 713/189–194
See application file for complete search history.

(56) References Cited

U.S. PATENT DOCUMENTS

| | | | |
|---|---|---|---|
| 6,324,659 | B1 | 11/2001 | Pierro |
| 2002/0124214 | A1 | 9/2002 | Ahrens, Jr. et al. |
| 2002/0199122 | A1 | 12/2002 | Davis et al. |
| 2006/0031938 | A1* | 2/2006 | Choi ............................ 726/25 |
| 2007/0067848 | A1* | 3/2007 | Gustave et al. .............. 726/25 |
| 2011/0067008 | A1 | 3/2011 | Srivastava et al. |

FOREIGN PATENT DOCUMENTS

JP          2005190402          7/2005

* cited by examiner

*Primary Examiner* — Ghazal Shehni
(74) *Attorney, Agent, or Firm* — Cuenot, Forsythe & Kim, LLC

(57) ABSTRACT

Automatically classifying security vulnerabilities in computer software applications by identifying candidate security vulnerabilities in a learning set including at least a first computer software application, classifying each of the candidate security vulnerabilities using predefined classifications, determining, for each of the candidate security vulnerabilities, values for predefined properties, creating a set of correlations between the property values and the classifications of the candidate security vulnerabilities, identifying a candidate security vulnerability in a second computer software application, determining, for the candidate security vulnerability in the second computer software application, values for the predefined properties, and using the set of correlations to classify the candidate security vulnerability in the second computer software application with a classification from the predefined classifications that best correlates with the property values of the candidate security vulnerability in the second computer software application.

13 Claims, 4 Drawing Sheets

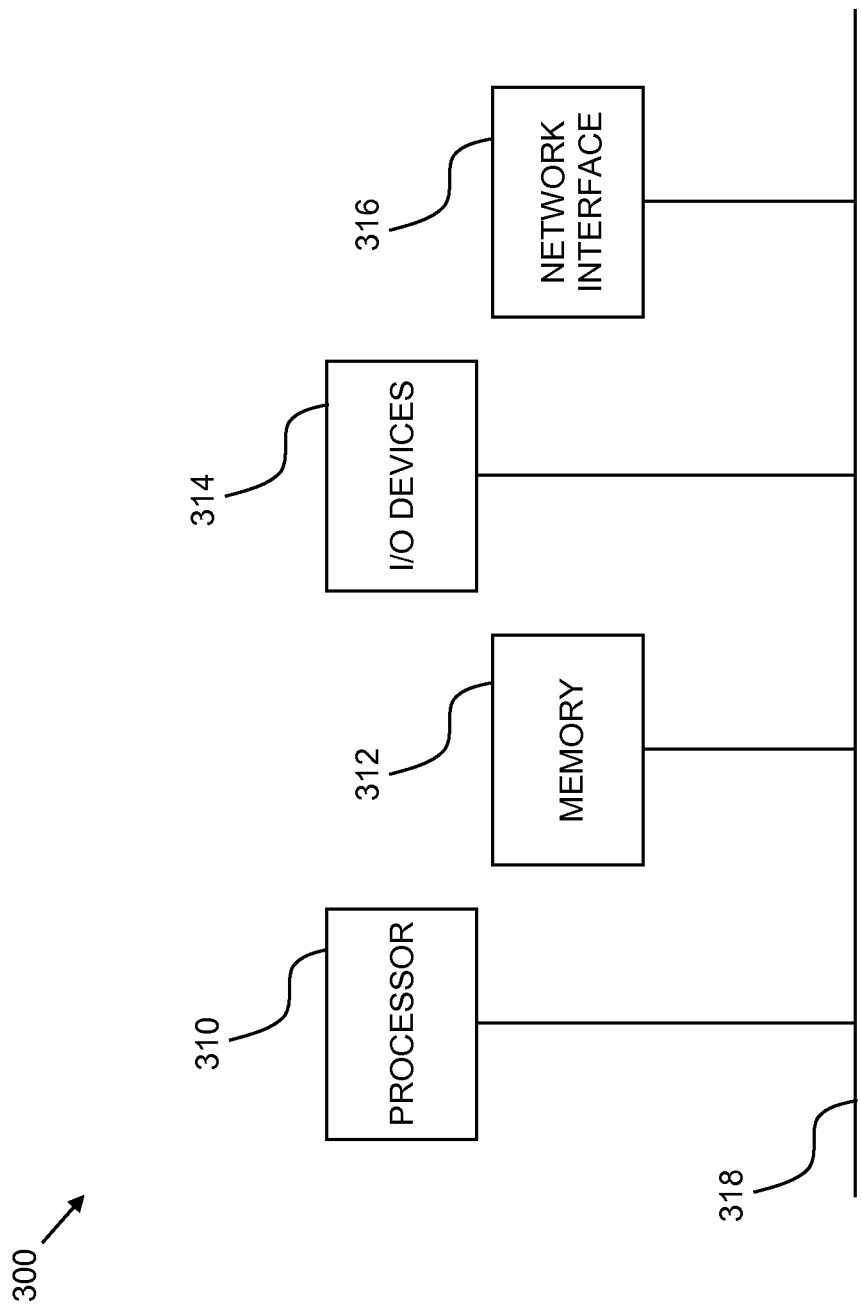

AUTOMATIC CLASSIFICATION OF SECURITY VULNERABILITIES IN COMPUTER SOFTWARE APPLICATIONS

FIELD OF THE INVENTION

The present invention relates to computer software analysis and testing in general.

BACKGROUND OF THE INVENTION

Static analysis is often used by computer software developers to provide information about computer software while applying only static considerations (i.e., without executing a computer software application). One type of static analysis, commonly referred to as static security analysis, is designed to uncover security vulnerabilities within computer software. Unfortunately, static analysis tools that perform static security analysis often provide hundreds or even thousands of findings that include many false positive reports of security vulnerabilities. This is due to the inherent limitations of static analysis, which operates on an abstract—and therefore imprecise—representation of a subject computer software application. Moreover, even among the real security vulnerabilities discovered by the analysis, not all the findings are equally important, as some of the vulnerabilities may be more exploitable than others, while some may be inherently more severe than others.

SUMMARY OF THE INVENTION

In one aspect of the invention a method is provided for automatically classifying security vulnerabilities in computer software applications, the method including identifying a plurality of candidate security vulnerabilities in a learning set including at least a first computer software application, classifying each of the candidate security vulnerabilities with any classification selected from a set of predefined classifications, determining, for each of the candidate security vulnerabilities, values for a plurality of predefined properties, creating a set of correlations between the property values and the classifications of the candidate security vulnerabilities, identifying a candidate security vulnerability in a second computer software application, determining, for the candidate security vulnerability in the second computer software application, values for the plurality of predefined properties, and using the set of correlations to classify the candidate security vulnerability in the second computer software application with a classification selected from the set of predefined classifications that best correlates with the property values of the candidate security vulnerability in the second computer software application.

In another aspect of the invention a method is provided for automatically classifying security vulnerabilities in computer software applications, the method including identifying an candidate security vulnerability in a computer software application, determining, for the candidate security vulnerability, values for a plurality of predefined properties, and using a set of correlations between property values and classifications of security vulnerabilities to classify the candidate security vulnerability with a classification selected from the set of predefined classifications that best correlates with the property values of the candidate security vulnerability.

In other aspects of the invention systems and computer program products embodying the invention are provided.

BRIEF DESCRIPTION OF THE DRAWINGS

The invention will be understood and appreciated more fully from the following detailed description taken in conjunction with the appended drawings in which:

FIG. 3 is a simplified block diagram illustration of an exemplary hardware implementation of a computing system, constructed and operative in accordance with an embodiment of the invention.

DETAILED DESCRIPTION OF THE INVENTION

Figure 1A:
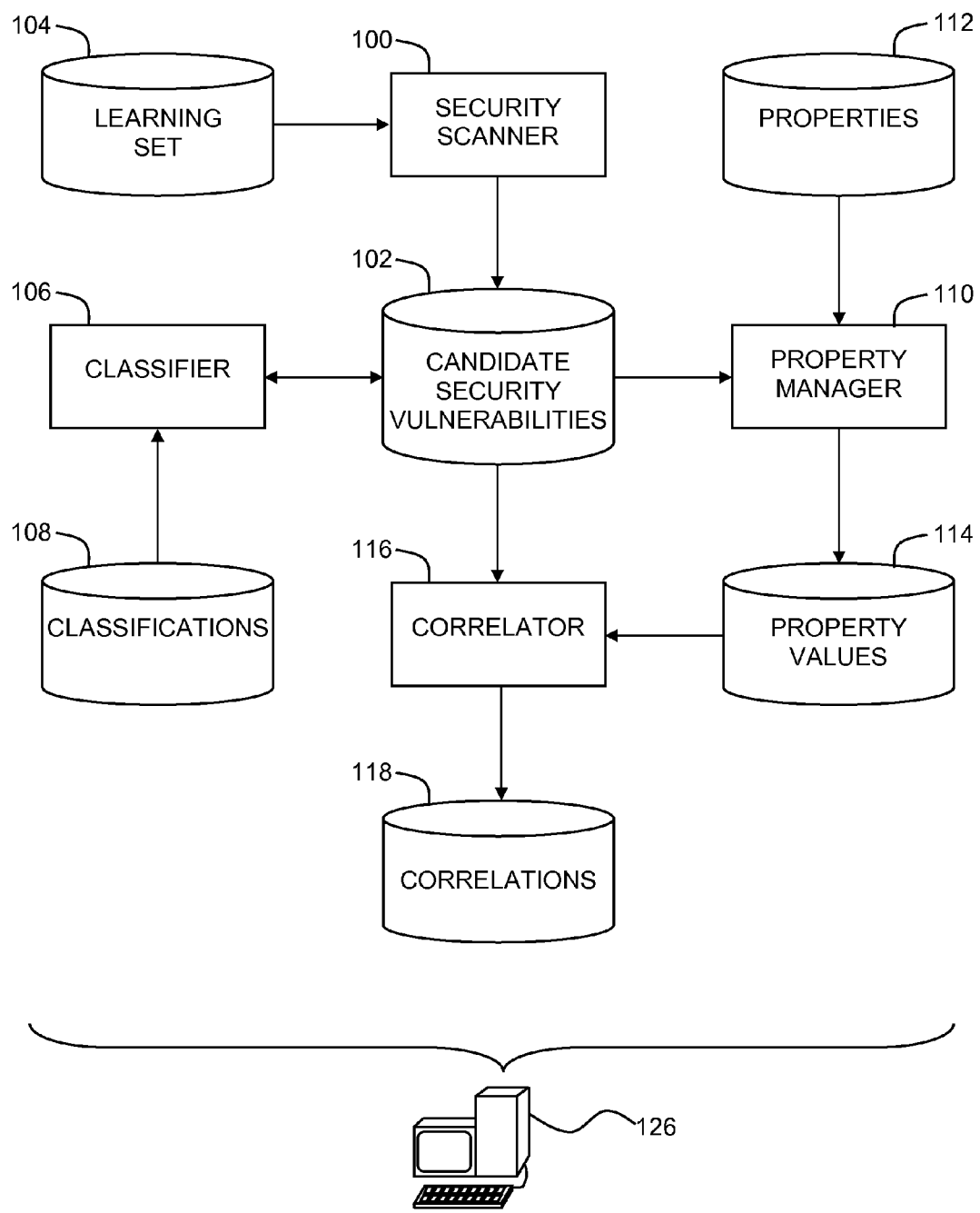
FIGS. 1A and 1B, taken together, is a simplified conceptual illustration of a system for automatically classifying security vulnerabilities in computer software applications, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1B:
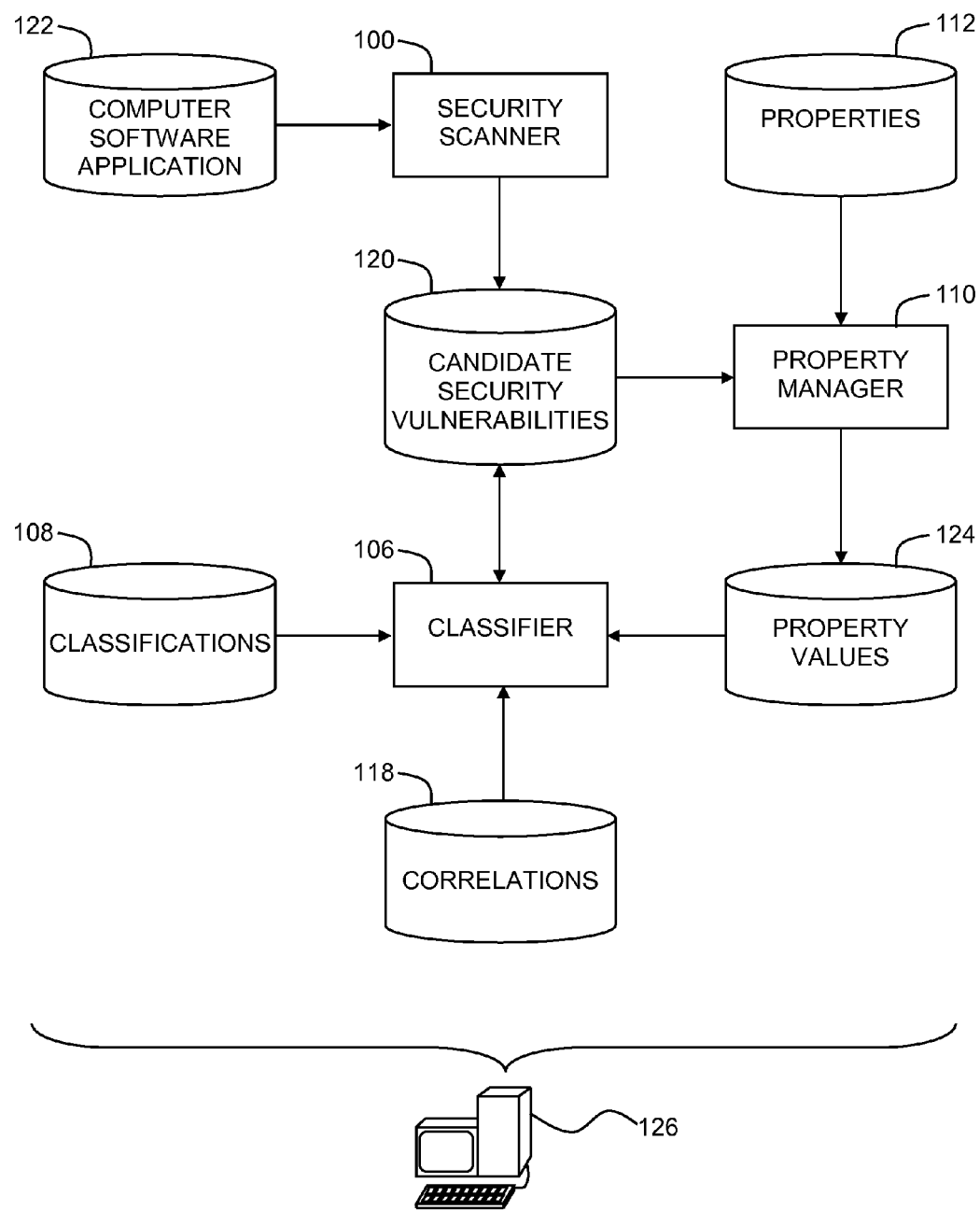

Reference is now made to FIGS. 1A and 1B which, taken together, is a simplified conceptual illustration of a system for automatically classifying security vulnerabilities in computer software applications, constructed and operative in accordance with an embodiment of the invention. In the system of FIG. 1A a security scanner 100 is configured to identify, in accordance with conventional techniques, a set 102 of one or more candidate security vulnerabilities in a learning set 104 of one or more computer software applications. A classifier 106 is configured to classify each of the candidate security vulnerabilities in set 102 with one or more classifications selected from a set 108 of predefined classifications. For example, a human operator may use classifier 106 to manually classify a candidate security vulnerability in set 102 as "false positive" or, if the human operator determines that the candidate security vulnerability is real, the human operator may use classifier 106 to manually classify the candidate security vulnerability as "real" and/or "severe" or "mild."

A property manager 110 is configured to determine, for each of the candidate security vulnerabilities in set 102, values for predefined properties in a set 112 of predefined properties, thereby creating a set 114 of property values. The predefined properties in set 112 may, for example, include:
- the number of instructions within the candidate security vulnerability;
- the percentage of the instructions within the candidate security vulnerability that lies within library code;
- the number of unique methods that are used by the instructions within the candidate security vulnerability;
- the number and kind of control-flow tests performed within the candidate security vulnerability;
- the number of "taint carriers" used to propagate vulnerable data within the candidate security vulnerability;
- the number of string manipulation statements, such as regular expression matching checks, within the candidate security vulnerability;
- the number of static variables through which data flow within the candidate security vulnerability;
- the number of containers, such as arrays or maps, through which data flow within the candidate security vulnerability.

A correlator 116 is configured to create a set 118 of correlations between the property values 114 and the classifications of the security vulnerabilities in set 102, preferably by employing machine learning techniques such as the k-means algorithm.

The system of FIG. 1A may be additionally configured as is now described with reference to FIG. 1B, where correlation set 118 is used to automatically classify candidate security vulnerabilities of a computer software application. Alternatively, the system of FIG. 1A is not additionally configured as is now described with reference to FIG. 1B, but rather the system of FIG. 1A represents an embodiment of the invention for creating correlation set 118 that is independent of the subsequent use of correlation set 118, whereas the system of FIG. 1B represents an embodiment of the invention for using correlation set 118 that is independent of the creation of correlation set 118.

In the system of FIG. 1B security scanner 100 is configured to identify, in accordance with conventional techniques, a set 120 of one or more candidate security vulnerabilities in a computer software application 122. Property manager 110 is configured to determine, for each of the candidate security vulnerabilities in set 120, values for the predefined properties in set 112, thereby creating a set 124 of property values. Classifier 106 is configured to use correlation set 118, in conjunction with classification set 108, to classify each candidate security vulnerability in set 120 with a classification selected from classification set 108 that best correlates with the property values 124 of the candidate security vulnerability.

Any of the elements shown in FIGS. 1A and 1B are preferably implemented by one or more computers, such as computer 126, in computer hardware and/or in computer software embodied in a non-transitory, computer-readable medium in accordance with conventional techniques.

Figure 2A:
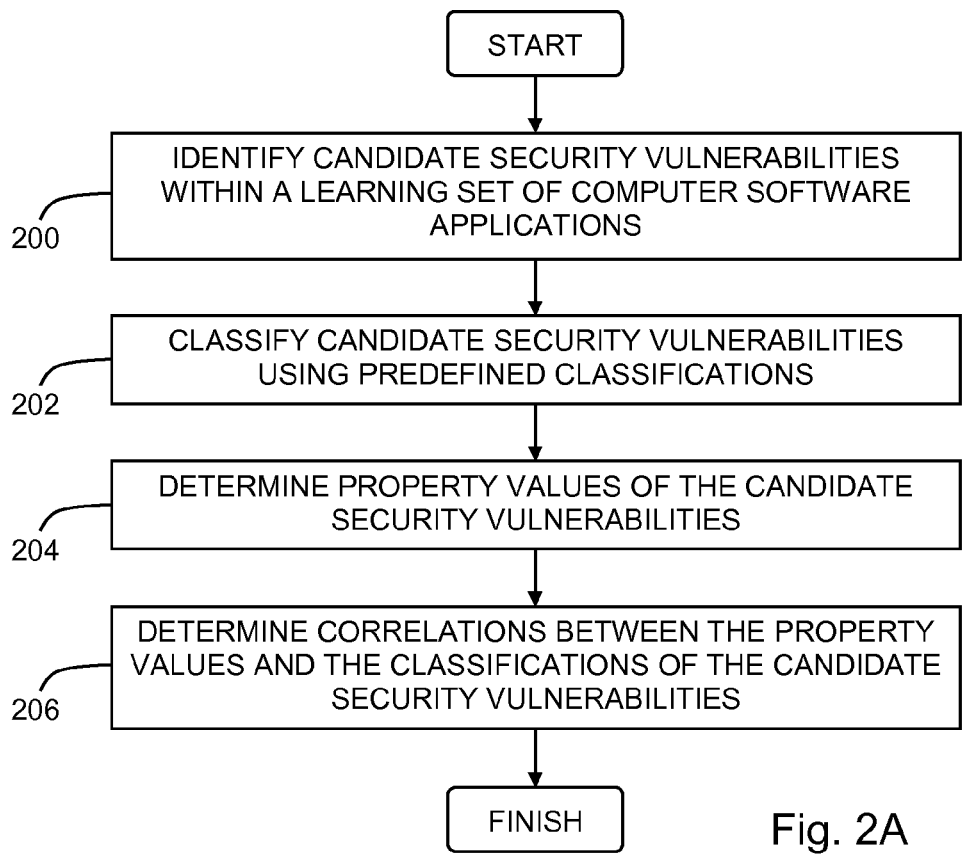
FIG. 2A is a simplified flowchart illustration of an exemplary method of operation of the system of FIG. 1A, operative in accordance with an embodiment of the invention.

Reference is now made to FIG. 2A, which is a simplified flowchart illustration of an exemplary method of operation of the system of FIG. 1A, operative in accordance with an embodiment of the invention. In the method of FIG. 2A, one or more candidate security vulnerabilities are identified in a learning set of one or more computer software applications (step 200). Each of the candidate security vulnerabilities are classified with one or more classifications selected from a set of predefined classifications (step 202). Values for predefined properties are determined each of the candidate security vulnerabilities (step 204). Correlations are determined between the property values and the classifications of the security vulnerabilities (step 206), preferably by employing machine learning techniques such as the k-means algorithm.

Figure 2B:
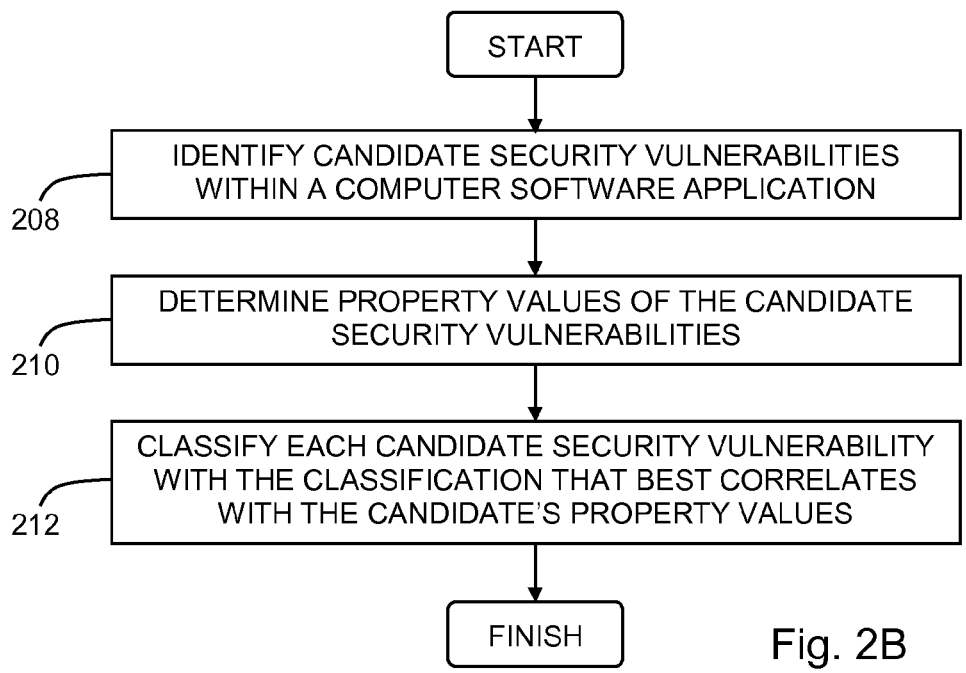
FIG. 2B is a simplified flowchart illustration of an exemplary method of operation of the system of FIG. 1B, operative in accordance with an embodiment of the invention.

Reference is now made to FIG. 2B, which is a simplified flowchart illustration of an exemplary method of operation of the system of FIG. 1B, operative in accordance with an embodiment of the invention. In the method of FIG. 2B, one or more candidate security vulnerabilities are identified in a computer software application (step 208). Values for predefined properties are determined each of the candidate security vulnerabilities (step 210). Using a set of correlations between property values and predefined classifications, each security vulnerability is classified with a classification, selected from the predefined classifications, that best correlates with the property values of the candidate security vulnerability (step 212).

The system of FIGS. 1A and 1B and the methods of FIGS. 2A and 2B may be illustrated with respect to the following simplified example in which two candidate security vulnerabilities, labeled A and B, of a computer software application are shown as follows:

A: String name=request.getParameter("name");//Source
   String userId=name+"ID";
   String escapedUserId=userId.replace('<', "");
   String escapedUserId=escapedUserId.replace('<', "");
   String escapedUserId=escapedUserId.replace('>', "");
   String escapedUserId=escapedUserId.replace(':', "");
   response.getWriter( ).write(escapedUserId);//Sink
B: String name=request.getParameter("name");//Source
   response.getWriter( ).write(name);//Sink In this example A is manually classified as a "false positive" while B is classified as a "true" security vulnerability. Values for A and B are determined for two properties X and Y, where X represents flow length and Y is the number of library statements (i.e., non-user code) in the flow. Thus $X(A)=7$ $X(B)=2$ and $Y(A)=0$//All statements are in user code $Y(B)=0$//All statements are in user code.

Machine learning techniques are then applied to determine the correlations between the property values of A and B and the classifications given to A and B. X is determined to be a useful differentiator between the "true" and "false positive" classifications, mapping the "true" classification to a high value and the "false positive" classification to a low value. Y, on the other hand, correlates the same property value to both classifications, and is thus not a useful differentiator between the "true" and "false positive" classifications. In this simplified example, a proposed approach for determining correlations between property values and classifications would converge on a predefined threshold value over X, such as (2+7)/2, as an empirical classification criterion for "true" versus "false positive" security vulnerabilities.

Referring now to FIG. 3, block diagram 300 illustrates an exemplary hardware implementation of a computing system in accordance with which one or more components/methodologies of the invention (e.g., components/methodologies described in the context of FIGS. 1A-2B) may be implemented, according to an embodiment of the invention.

As shown, the techniques for controlling access to at least one resource may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer (not shown).

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A system for automatically classifying security vulnerabilities in computer software applications, the system comprising:
a hardware processor configured to initiate executable operations comprising:
identifying a plurality of candidate security vulnerabilities in a learning set including at least a first computer software application;
classifying each of the plurality of candidate security vulnerabilities with any classification selected from a set of predefined classifications;
determining, for each of the plurality of candidate security vulnerabilities, values for a plurality of predefined properties;
creating, for each of the plurality of candidate security vulnerabilities, a set of correlations between the values for the plurality of predefined properties and the respective classification of the candidate security vulnerability;
identifying a candidate security vulnerability in a second computer software application;
determining, for the candidate security vulnerability in the second computer software application, values for the plurality of predefined properties; and
classifying, using the set of correlations, the candidate security vulnerability in the second computer software application with a classification selected from the set of predefined classifications that best correlates with the values for the plurality of predefined properties of the candidate security vulnerability in the second computer software application.

2. The system according to claim 1 wherein creating the set of correlations by determining correlations between the values of security vulnerabilities for each of the candidate security vulnerabilities in the learning set and the classifications of the candidate security vulnerabilities in the learning set comprises:
creating the set of correlations by performing machine learning.

3. A system for automatically classifying security vulnerabilities in computer software applications comprising:
a hardware processor configured to initiate executable operations comprising:
identifying a candidate security vulnerability in a computer software application;
determining, for the candidate security vulnerability, values for a plurality of predefined properties selected from a group consisting of a number of instructions within the candidate security vulnerability, a percentage of the instructions within the candidate security vulnerability that lie within library code, a number of unique methods that are used by the instructions within the candidate security vulnerability, a number and kind of control-flow tests performed within the candidate security vulnerability, a number of taint carriers used to propagate vulnerable data within the candidate security vulnerability, a number of string manipulation statements within the candidate security vulnerability, a number of static variables through which data flow within the candidate security vulnerability, and a number of containers through which data flow within the candidate security vulnerability; and
classifying, using a set of correlations between values for the plurality of predefined properties and a set of predefined classifications of security vulnerabilities, the candidate security vulnerability with a classification selected from the set of predefined classifications of security vulnerabilities that best correlates with the values for the plurality of predefined properties of the candidate security vulnerability.

4. The system according to claim 3 wherein the hardware processor is further configured to initiate executable operations comprising:
identifying a plurality of candidate security vulnerabilities in a learning set including at least one other computer software application;
classifying each of the candidate security vulnerabilities in the learning set with any classification selected from the set of predefined classifications;
determining, for each of the candidate security vulnerabilities in the learning set, values for the plurality of predefined properties; and
creating the set of correlations by determining correlations between the values of security vulnerabilities for each of the candidate security vulnerabilities in the learning set and the classifications of the candidate security vulnerabilities in the learning set.

5. The system according to claim 4 wherein creating the set of correlations by determining correlations between the values of security vulnerabilities for each of the candidate security vulnerabilities in the learning set and the classifications of the candidate security vulnerabilities in the learning set comprises:
creating the set of correlations by performing machine learning.

6. A method for automatically classifying security vulnerabilities in computer software applications, the method comprising:
identifying a plurality of candidate security vulnerabilities in a learning set including at least a first computer software application;
classifying each of the plurality of candidate security vulnerabilities with any classification selected from a set of predefined classifications;
determining, using a hardware processor, for each of the plurality of candidate security vulnerabilities, values for a plurality of predefined properties;
creating, for each of the plurality of candidate security vulnerabilities, a set of correlations between the values for the plurality of predefined properties and the respective classification of the candidate security vulnerability;
identifying a candidate security vulnerability in a second computer software application;
determining for the candidate security vulnerability in the second computer software application, values for the plurality of predefined properties; and
classifying, using the set of correlations, the candidate security vulnerability in the second computer software application with a classification selected from the set of predefined classifications that best correlates with the values for the plurality of predefined properties of the candidate security vulnerability in the second computer software application.

7. The method according to claim 6 wherein creating the set of correlations by determining correlations between the values of security vulnerabilities for each of the candidate security vulnerabilities in the learning set and the classifications of the candidate security vulnerabilities in the learning set comprises:
creating the set of correlations by performing machine learning.

8. A method for automatically classifying security vulnerabilities in computer software applications, the method comprising:
identifying a candidate security vulnerability in a computer software application;
determining, using a hardware processor, for the candidate security vulnerability, values for a plurality of predefined properties; and
classifying, using a set of correlations between values for the plurality of predefined properties and a set of predefined classifications of security vulnerabilities, the candidate security vulnerability with a classification selected from the set of predefined classifications of security vulnerabilities that best correlates with the values for the plurality of predefined properties of the candidate security vulnerability, wherein the plurality of predefined properties are selected from a group consisting of a number of instructions within the candidate security vulnerability, a percentage of the instructions within the candidate security vulnerability that lie within library code, a number of unique methods that are used by the instructions within the candidate security vulnerability, a number and kind of control-flow tests performed within the candidate security vulnerability, a number of taint carriers used to propagate vulnerable data within the candidate security vulnerability, a number of string manipulation statements within the candidate security vulnerability, a number of static variables through which data flow within the candidate security vulnerability, and a number of containers through which data flow within the candidate security vulnerability.

9. The method according to claim 8 further comprising:
identifying a plurality of candidate security vulnerabilities in a learning set including at least one other computer software application;
classifying each of the candidate security vulnerabilities in the learning set with any classification selected from the set of predefined classifications;
determining, for each of the candidate security vulnerabilities in the learning set, values for the plurality of predefined properties; and
creating the set of correlations by determining correlations between the values of security vulnerabilities for each of the candidate security vulnerabilities in the learning set and the classifications of the candidate security vulnerabilities in the learning set.

10. The method according to claim 8 wherein creating the set of correlations by determining correlations between the values of security vulnerabilities for each of the candidate security vulnerabilities in the learning set and the classifications of the candidate security vulnerabilities in the learning set comprises:
creating the set of correlations by performing machine learning.

11. A computer program product for automatically classifying security vulnerabilities in computer software applications, the computer program product comprising:
a computer-readable storage device, wherein the computer-readable storage device is not a transitory, propagating signal, per se; and
computer-readable program code embodied in the computer-readable storage device, wherein the computer-readable program code is configured to:
identify a candidate security vulnerability in a computer software application;
determine, for the candidate security vulnerability, values for a plurality of predefined properties selected from a group consisting of a number of instructions within the candidate security vulnerability, a percentage of the instructions within the candidate security vulnerability that lie within library code, a number of unique methods that are used by the instructions within the candidate security vulnerability, a number and kind of control-flow tests performed within the candidate security vulnerability, a number of taint carriers used to propagate vulnerable data within the candidate security vulnerability, a number of string manipulation statements within the candidate security vulnerability, a number of static variables through which data flow within the candidate security vulnerability, and a number of containers through which data flow within the candidate security vulnerability; and
classifying, using a set of correlations between values of security vulnerabilities and classifications of security vulnerabilities, the candidate security vulnerability with a classification selected from the set of predefined classifications that best correlates with the values of security vulnerabilities of the candidate security vulnerability.

12. The system according to claim 11 wherein the computer-readable program code further is configured to:
identify a plurality of candidate security vulnerabilities in a learning set including at least one other computer software application;
classify each of the candidate security vulnerabilities in the learning set with any classification selected from the set of predefined classifications;
determine, for each of the candidate security vulnerabilities in the learning set, values for the plurality of predefined properties; and
create the set of correlations by determining correlations between the values of security vulnerabilities for each of the candidate security vulnerabilities in the learning set and the classifications of the candidate security vulnerabilities in the learning set.

13. The system according to claim 12 wherein the computer-readable program code is configured to create the set of correlations by performing machine learning.

* * * * *